UNITED STATES PATENT OFFICE.

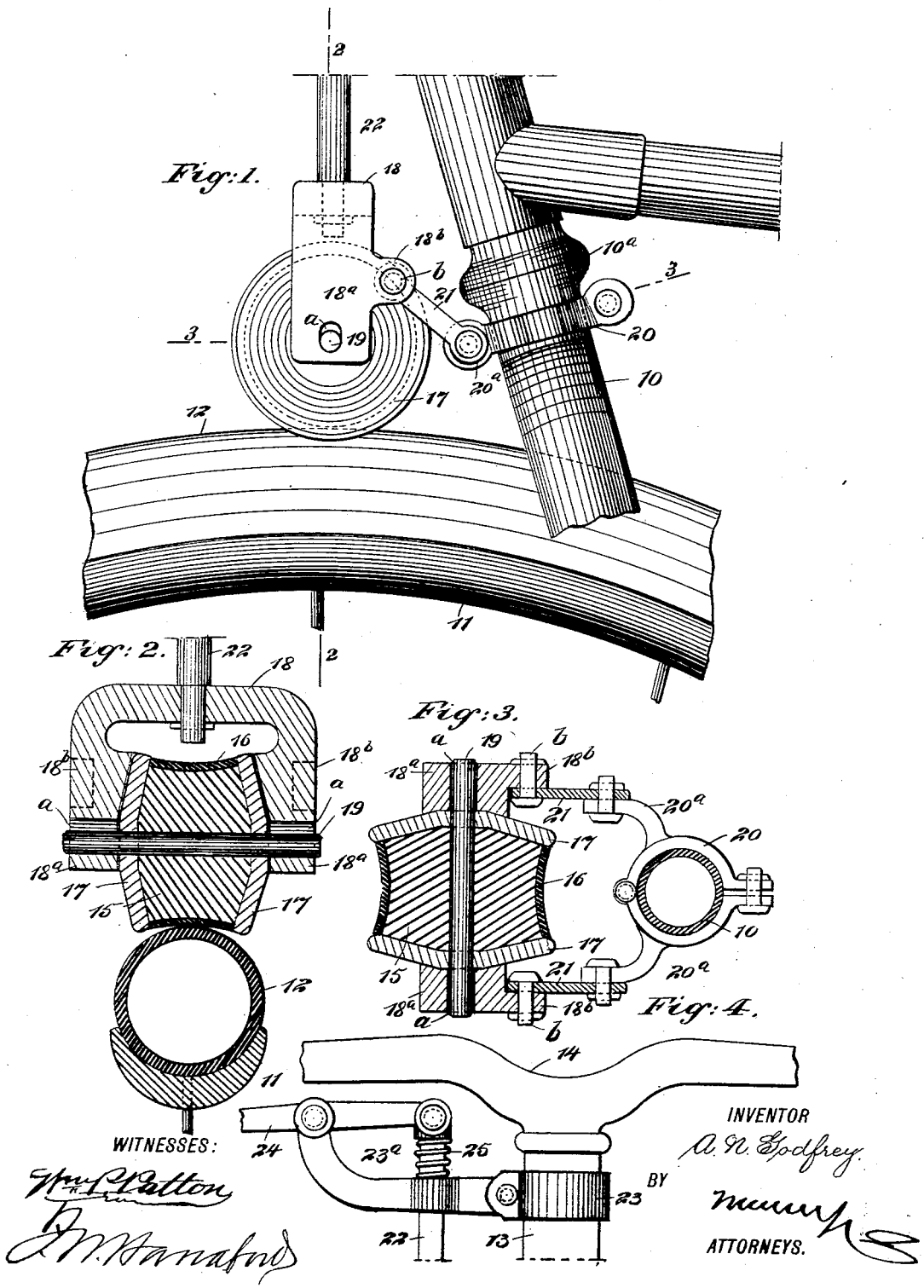

ALBERT N. GODFREY, OF PORT TOWNSEND, WASHINGTON.

BICYCLE-BRAKE.

SPECIFICATION forming part of Letters Patent No. 580,271, dated April 6, 1897.

Application filed September 1, 1896. Serial No. 604,577. (No model.)

*To all whom it may concern:*

Be it known that I, ALBERT N. GODFREY, of Port Townsend, in the county of Jefferson and State of Washington, have invented new and useful Improvements in Bicycle-Brakes, of which the following is a full, clear, and exact description.

This invention relates to brakes for bicycles, and has for its object to provide a novel simple device of the indicated character which will be very effective in operation and that will avoid abrasive wear on the gum tire of the vehicle.

The invention consists in the novel construction and combination of parts, as is hereinafter described, and defined in the claims.

Reference is to be had to the accompanying drawings, forming a part of this specification, in which similar characters of reference indicate corresponding parts in all the figures.

Figure 1 is a side view of the novel brake in position on a bicycle shown in part. Fig. 2 is a transverse vertical section substantially on the line 2 2 in Fig. 1. Fig. 3 is a horizontal transverse sectional plan view substantially on the line 3 3 in Fig. 1; and Fig. 4 is a front view of a bicycle handle-bar, the upper end of the supporting-post therefor, and a spring-pressed lever supported on the post and pivoted to the upper end of a pusher-bar that is connected by its lower end to the improved brake.

In illustrating the construction and application of the improvement to a bicycle, 10 indicates the front frame-fork of a safety-bicycle; 11, a portion of the front-wheel rim; 12, a part of the pneumatic tire bedded in the rim, and 13 the upper portion of the front post, to which is attached the handle-bar 14, shown broken.

The improved brake consists, essentially, of a pulley 15, having a slightly-concave rim and convex or coniform ends, and the body of the pulley may be of wood or other suitable material. The rim is covered with a secured facing 16, of vulcanized gum, leather, or other available material, that is adapted to bite upon the tire 12 when pressed thereon, as will be further mentioned.

On the convex ends of the pulley-body 15 dished washer-like cap-plates 17 are secured, being fitted closely upon the ends of the pulley and having their exterior faces correspondingly convexed. A hanger-shoe 18 is provided, which is in bail form, the depending limbs $18^a$ of the shoe being shaped on their inner surfaces to intimately contact with the convex outer faces of the cap-plates 17 when applied to the latter.

The pintle 19, that passes centrally through the pulley-body 15 and is secured therein, projects sufficiently beyond the cap-plates 17 to engage with the limbs $18^a$ of the shoe 18, and it will be seen that the opposite perforations $a$, formed in said limbs to receive the journal ends of the pintle, are longitudinally elongated. The hanger-shoe 18 has ears $18^b$ formed on the edges of the depending limbs $18^a$, said ears being oppositely located and perforated in alinement for the reception of pivots $b$.

A hinged clamp 20 is furnished as a preferred means for detachably securing the brake device upon the frame-fork 10 below and near the crown $10^a$ of the same, and, as shown, opposite arms $20^a$ are formed on the main members of the clamp and project rearwardly in the same plane.

Link-plates 21 are pivoted at their front ends upon the ears $18^b$ and at their rear ends to the perforated front ends of the arms $20^a$, whereby the hanger-shoe 18 is afforded a hinged connection with the frame-fork 10. From the top cross-bar of the hanger-shoe 18 the pusher-bar 22 is upwardly extended and has such proportionate length that its upper portion may have sliding engagement with the laterally-projecting member $23^a$ of the clamp 23, that clasps the steering-post 13 near the handle-bar 14.

On the limb $23^a$ a brake-actuating lever 24 is pivoted, one end of which is jointed to the upper end of the pusher-bar 22, as shown in Fig. 4, and the lever mentioned, in complete form, is extended at its free end below and near to the handle-bar 14, so as to be conveniently grasped for a depression of the bar 22 in an obvious manner. A spring 25 is introduced between a headed enlargement of the pusher-bar and the limb $23^b$, the stress of which spring causes a depression of the free end of the lever 24, and also slightly elevates the pusher-bar, so that the pulley 15 has its slightly-concave face normally retracted from the tire of the bicycle-wheel it is to contact with, such a retraction being just sufficient to avoid frictional contact with the tire.

The operation of the improved brake is as follows: The rider by a slight elevation of the lever 24 effects a downward movement of the pusher-bar 22 and a corresponding depression of the shoe 18, and as the limbs 18ª of the latter are adapted to slide a limited degree on the pintle 19 the concave faces of said limbs will be brought into forcible engagement with the convex exteriors of the cap-plates 17. A depression of the pulley-body 15 results when the limbs 18ª press on the cap-plates 17, and the enforced contact of the facing 16 with the tire 12 will cause the pulley to rotate. The revolution of the pulley 15 induces frictional resistance between the limbs of the shoe 18 and cap-plates 17, and a graduated resistance to rotation of the pulley and wheel of the bicycle results therefrom, and an abrupt abrasive scrubbing action on the tire is avoided.

Owing to the peculiar construction of the brake mechanism that has been described, it will be evident that a slight application of manual force on the free end of the lever 24 will partially or entirely arrest progressive movement of the bicycle, so that danger of accidents due to a want of an effective brake mechanism will be completely obviated by employment of the herein-described improvement.

Having thus described my invention, I claim as new and desire to secure by Letters Patent—

1. A bicycle brake device, comprising a hanger-shoe having depending members provided with longitudinally-elongated slots and inclined inner walls, a pulley-body having a slightly-pliable periphery, convex cap-plates on the ends of said pulley-body and conforming to the said inner walls of the shoe-limbs, a pintle projecting through said pulley and having its journal ends loosely inserted in said slots, and a spring-supported presser-bar normally holding the pulley and shoe elevated and the pulley free from contact with the inclined side walls of the shoe, but free to be manually depressed, as and for the purpose described.

2. A bicycle brake device, comprising a pulley-body concave on its periphery, a slightly-pliable facing thereon, convex cap-plates on the ends of the pulley, a hanger-shoe having depending limbs formed with inner inclined walls conforming to the convexity of the cap-plates and longitudinally-elongated slots in said limbs, a pintle projecting through the pulley-body and having its journal ends in said longitudinally-elongated slots, a spring-supported presser-bar having its lower end secured to said shoe and normally holding the pulley and shoe elevated and the inner inclined walls of the latter free from contact with said cap-plates, a clamping device extending from the frame of the bicycle and links connecting said shoe with said clamping device, whereby when the presser-bar is depressed the pulley will be brought into contact with the tire and the cap-plates into frictional contact with the inner inclined walls of the hanger-shoe limb, as and for the purpose described.

ALBERT N. GODFREY.

Witnesses:
A. L. McClinton,
J. B. Hogg.